July 15, 1952     A. GOUGE     2,602,970
WINDOW FOR PRESSURIZED CHAMBERS
Filed Oct. 11, 1950     3 Sheets-Sheet 2

Inventor
Arthur Gouge
By Moses, Nolte, Crews & Berry
Attorneys

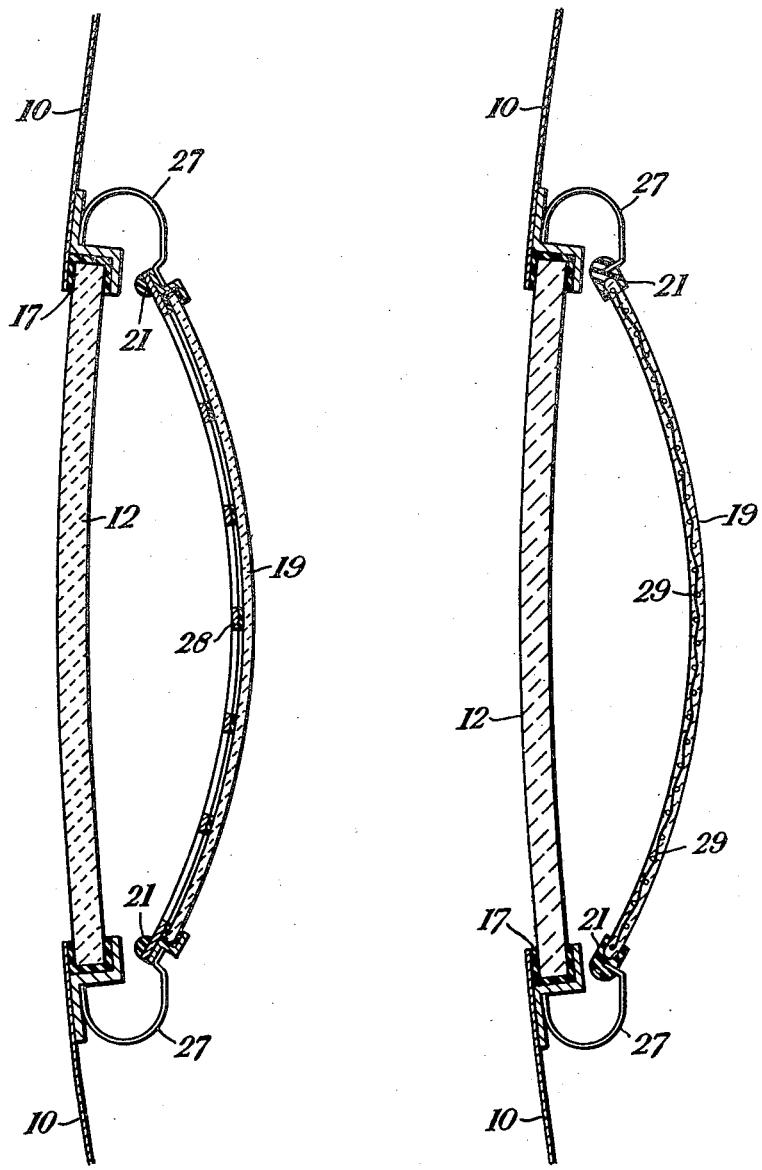

Patented July 15, 1952

2,602,970

UNITED STATES PATENT OFFICE 2,602,970

WINDOW FOR PRESSURIZED CHAMBERS

Arthur Gouge, Ryde, Isle of Wight, assignor to Saunders-Roe Limited, Osborne, England Application October 11, 1950, Serial No. 189,540
In Great Britain October 13, 1949

6 Claims. (Cl. 20—56.5)

It has hitherto been the practice to use relatively flat panels of transparent material, shaped to the form of the body of the cabin, as the portlights or windows in pressurised chambers such as aircraft cabins. These portlights are often made of plastic material, for example the material sold under the British Registered Trade Mark "Perspex" and as they have to withstand a large pressure difference at high altitudes, the panel constituting each portlight must be thick. Such panels are supported at their edges by the wall of the cabin and are liable to fatigue as the result of repeated flexure under the differential pressure acting on them under different flying conditions. They are, moreover, subject at altitude to a large temperature gradient and, being thick and of poor thermal conductivity, may shear under this temperature gradient.

Failure of a portlight at altitude, by shearing or as the result of fatigue, may have serious effects on the occupants of the cabin. This invention has for its object to provide a portlight which will safeguard against the possibility of failure.

The invention provides, in a pressurised aircraft cabin, a portlight comprising an outer transparent panel flush with, and forming at altitude an airtight joint with, the outer skin of the aircraft, and an inner transparent panel normally held spaced from the outer panel by means which, in the event of failure of the outer panel at altitude, will yield to allow of outward movement of the inner panel, under the excess pressure within the cabin, into position to seal wholly or partially the resultant leak in the cabin.

Under normal conditions, a flow of warm air may be circulated through the gap between the two panels, thereby maintaining the outer panel warm and reducing the tendency of mist to form on the portlight. If, however, the outer panel fails, the inner panel will be forced outwards into contact with it, the rim of the inner panel seating against the rim of the window opening.

The inner panel may consist of a sheet of transparent material, e. g. Perspex, sufficiently thick for it to withstand the pressure differential if called upon to do so, and is preferably of part spherical shape and inwardly convex. We may, however, use a thinner sheet of transparent material, unable of itself to withstand the pressure differential and reinforce it with a metal grid or lattice either abutting against its outer surface or embedded in it. The metal grid or lattice may consist of metal wire, strip or perforated sheet and will afford support to the transparent material while allowing the passengers to see out through its interstices.

Three forms of portlight according to the invention for a pressurised aircraft cabin will now be described in detail, by way of example, with reference to the accompanying drawings, in which:

Fig. 4 is a section through the second form of portlight, and

Fig. 5 is a section through the third form of portlight.

Figure 1:
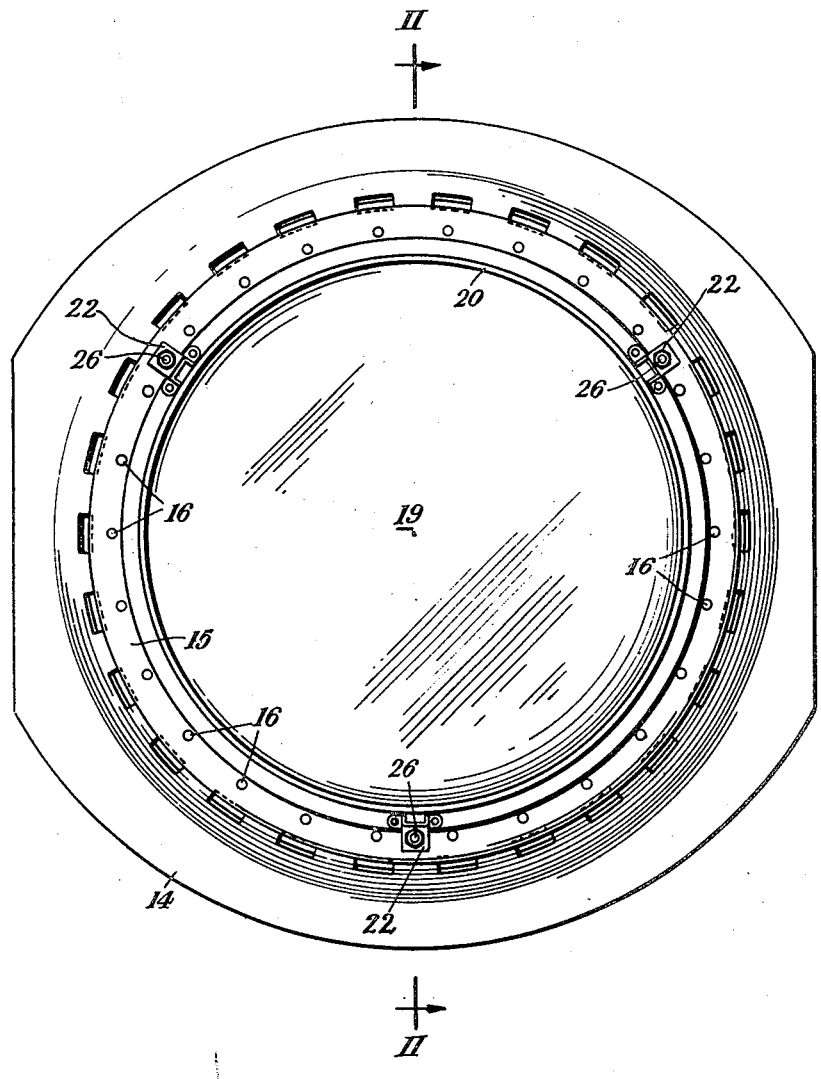
Fig. 1 is an elevation of the first form of portlight, seen from the inside.
Figure 2:
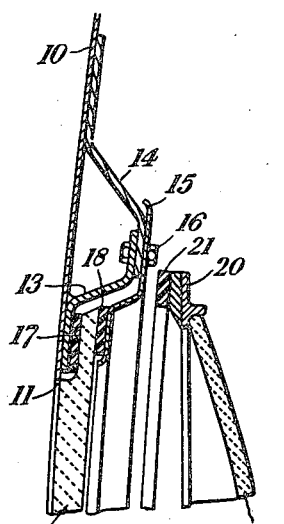
Fig. 2 is a section, on an enlarged scale, on the line II—II in Fig. 1.
Figure 3:
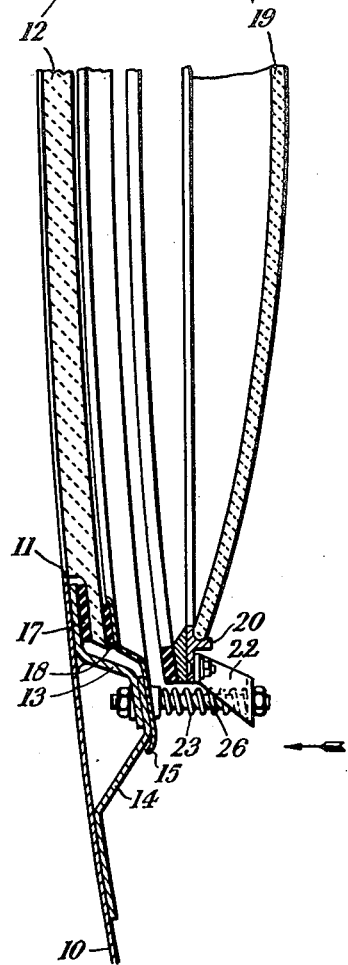
Fig. 3 is a detail view looking in the direction of the arrow in Fig. 2.
Figure 3:
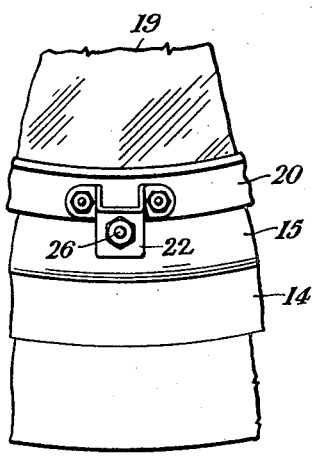

The construction shown in Figs. 1-3 will be first described.

The skin 10 of the aircraft cabin is formed with a circular aperture 11 in which is fitted an outer panel 12 of Perspex or other transparent material. The panel is held in position by a supporting structure, consisting of three rings 13, 14, 15 secured together by bolts 16, 26; and sealing rings 17, 18 of rubber or like material are fitted to the rim of the panel 12 on its outer and inner faces respectively. Under the excess pressure which prevails within the cabin at altitude, the ring 17 forms a seal against the ring 13 and the ring 15 is held in sealing engagement with the ring 18. The rubber rings 17 and 18 may also seal the window opening under ground level conditions, but this is not essential provided that the seal is maintained at altitude.

Inside the panel 12 is provided an emergency inner panel 19 of Perspex or other transparent material which is relied upon to seal the window opening in case the outer panel 12 should fail at altitude.

The inner panel 19 is of inwardly convex part spherical form and is mounted in a circumferential metal ring 20 carrying on its outer face a sealing ring 21 of rubber or the like. The ring 20 carries three inwardly projecting brackets 22 which are free to slide on the bolts 26 and are normally held, by springs 23 surrounding the bolts 26, in the position shown in Fig. 2 in which the inner panel 19 is spaced inwardly from the outer panel, leaving a space for circulation of warm air between the panels 12, 19.

The bolts 26 and springs 23 constitute spring pillars which will collapse, if the outer panel 12 fails at altitude, to allow the pressure within the cabin to force the inner panel 19 outwards into a position in which the rubber ring 21 forms a seal against the ring 15 to prevent the escape of air through the window opening.

It is not essential that a complete seal should be formed, as pumps in the aircraft will be able to maintain sufficient pressure in the cabin, provided the major area of the failed outer panel 12 is filled by the inner panel 19, to allow the aircraft to descend to a safe altitude without fatal results to the passengers.

Any other form of collapsible support may be used for the inner panel 19 in place of the spring pillars. Thus, as shown in Figs. 4 and 5, I may use in place of them U-section metal brackets 27, which will collapse, when the outer panel 12 fails, to allow the inner panel 19 to move outwardly to form the seal.

As above noted, the inner panel 19 may, if desired, be reinforced by a metal grid or lattice abutting against its outer surface or embedded in it.

In Fig. 4 the inner panel 12, which is thinner than that shown in Figs. 1-3, is shown abutting against an external metal grid 28. In Fig. 5, the thin inner panel 19 is reinforced by an internal metal lattice 29 embedded in it.

What I claim as my invention and desire to secure by Letters Patent is:

1. In a pressurised aircraft cabin having an outer skin, the combination of a transparent window in said skin, sealing means for preventing leakage of air from the cabin around said window, an inner panel, and collapsible means between the peripheries of said window and said inner panel for normally holding said inner panel spaced from said window, said collapsible means yielding, in the event of failure of said window, to permit of outward movement of said inner panel, by the excess pressure within the cabin, to position to seal partially at least the leak through said failed window.

2. In a pressurised aircraft cabin having an outer skin, the combination of a transparent window in said skin, sealing means for preventing leakage of air from the cabin around said window, an inner panel, and collapsible spring pillars for normally maintaining said inner panel spaced from said window, said pillars yielding, in the event of failure of said window, to permit of outward movement of said inner panel, by the excess pressure within the cabin, to position to seal partially at least the leak through said failed window.

3. In a pressurised aircraft cabin having an outer skin, the combination of a transparent window in said skin, sealing means for preventing leakage of air from the cabin around said window, a transparent part spherical and inwardly convex inner panel, and collapsible means between the peripheries of said window and said inner panel for normally holding said inner panel spaced from said window, said collapsible means yielding, in the event of failure of said window, to permit of outward movement of said inner panel, by the excess pressure within the cabin, to position to seal partially at least the leak through said failed window.

4. In a pressurised aircraft cabin having an outer skin formed with a window opening, the combination of a transparent outer panel flush with the skin and fitted in the window opening to seal the same, a transparent inner panel having a sealing ring on its outer face extending around its periphery, and collapsible means between the peripheries of said outer and inner panels for normally holding said inner panel spaced from said outer panel, said collapsible means yielding, in the event of failure of said outer panel, to permit said inner panel to be forced outwards by the excess pressure within the cabin to bring said sealing ring into sealing engagement with the rim of the window opening.

5. In a pressurised aircraft cabin, a combination as claimed in claim 1, wherein the inner panel is of transparent material, and comprising a metal grid abutting against the outer surface of said inner panel.

6. In a pressurised aircraft cabin, a combination as claimed in claim 1, wherein the inner panel is of transparent material, and comprising a metal reinforcing lattice embedded within said inner panel.

ARTHUR GOUGE.

REFERENCES CITED

The following references are of record in the file of this patent:

UNITED STATES PATENTS

| Number | Name | Date |
|---|---|---|
| 2,269,488 | Schwartz | Jan. 13, 1942 |
| 2,409,808 | Sowle | Oct. 22, 1946 |